United States Patent
Kogan

(10) Patent No.: US 9,704,236 B2
(45) Date of Patent: Jul. 11, 2017

(54) DETECTING PRINTING EFFECTS

(75) Inventor: Hadas Kogan, Zichron Yaacov (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 14/345,389

(22) PCT Filed: Sep. 27, 2011

(86) PCT No.: PCT/US2011/053444
§ 371 (c)(1),
(2), (4) Date: Mar. 17, 2014

(87) PCT Pub. No.: WO2013/048373
PCT Pub. Date: Apr. 4, 2013

(65) Prior Publication Data
US 2014/0348393 A1   Nov. 27, 2014

(51) Int. Cl.
*G06T 7/00* (2017.01)
*H04N 1/56* (2006.01)
(Continued)

(52) U.S. Cl.
CPC ........ *G06T 7/001* (2013.01); *G03G 15/5062* (2013.01); *G06T 7/0002* (2013.01); *G06T 7/90* (2017.01); *H04N 1/0005* (2013.01); *H04N 1/00015* (2013.01); *H04N 1/00023* (2013.01); *H04N 1/00045* (2013.01);
(Continued)

(58) Field of Classification Search
CPC ....... G06T 7/001; G06T 7/408; G06T 7/0002; H04N 1/6047; H04N 1/6036; H04N 1/00023; H04N 1/00063; H04N 1/0005; H04N 1/00045; H04N 1/00068;
(Continued)

(56) References Cited

U.S. PATENT DOCUMENTS 4,685,139 A   8/1987   Masuda et al.
5,642,202 A * 6/1997   Williams et al. ............. 358/406
(Continued)

FOREIGN PATENT DOCUMENTS

CN   101799434   8/2010
JP   H08-043317   2/1996
(Continued)

OTHER PUBLICATIONS

Giannattasio, Tom. "Unveiling Photoshop Masks." Smashing Magazine. Dec. 17, 2009. Accessed Apr. 29, 2015. http://www.smashingmagazine.com/2009/12/17/unveiling-photoshop-masks/.*
(Continued)

*Primary Examiner* — Utpal Shah
(74) *Attorney, Agent, or Firm* — Fabian VanCott

(57) ABSTRACT

A method for detecting printing defects includes, with a physical computing system, creating a matched reference image from a digital image, colors of said matched reference image being closer matched to a scanned image of said digital image. The method further includes, with said physical computing system, determining a color difference between corresponding points on said matched reference image and said scanned image; and with said physical computing system, identifying points that have said color distance greater than a predefined threshold as potential defects.

19 Claims, 9 Drawing Sheets

(51) Int. Cl.
*G03G 15/00* (2006.01)
*H04N 1/00* (2006.01)
*H04N 1/60* (2006.01)
*G06T 7/90* (2017.01)
*G06K 15/02* (2006.01)

(52) U.S. Cl.
CPC ..... *H04N 1/00047* (2013.01); *H04N 1/00063* (2013.01); *H04N 1/00068* (2013.01); *H04N 1/00082* (2013.01); *H04N 1/56* (2013.01); *H04N 1/6036* (2013.01); *H04N 1/6047* (2013.01); *G06K 15/02* (2013.01); *G06T 2207/10004* (2013.01); *G06T 2207/30144* (2013.01)

(58) Field of Classification Search
CPC ........... H04N 1/00082; H04N 1/00047; H04N 1/00015; H04N 1/56; G03G 15/5062; G06K 15/02
USPC .......................................................... 382/112
See application file for complete search history.

(56) References Cited

U.S. PATENT DOCUMENTS

| | | | |
|---|---|---|---|
| 6,154,561 A | 11/2000 | Pratt et al. | |
| 7,023,584 B2* | 4/2006 | Cowan | H04N 1/6033 358/1.9 |
| 7,162,073 B1 | 1/2007 | Akgul et al. | |
| 7,965,414 B2* | 6/2011 | Wu | H04N 1/60 358/1.9 |
| 7,978,903 B2 | 7/2011 | Kojima et al. | |
| 8,150,106 B2* | 4/2012 | Wu | B41J 29/393 358/504 |
| 9,098,897 B2* | 8/2015 | Kisilev | H04N 1/00092 |
| 2001/0039892 A1 | 11/2001 | Frossard et al. | |
| 2005/0240376 A1 | 10/2005 | Uwatoko et al. | |
| 2006/0110009 A1* | 5/2006 | Klassen | G06T 7/001 382/112 |
| 2006/0158703 A1* | 7/2006 | Kisilev | G06T 7/001 358/504 |
| 2007/0024928 A1* | 2/2007 | Ono | 358/504 |
| 2007/0047801 A1* | 3/2007 | Kojima | G06T 7/0004 382/149 |
| 2008/0212844 A1 | 9/2008 | Turke et al. | |
| 2009/0010498 A1* | 1/2009 | Gaston et al. | 382/112 |
| 2010/0165015 A1 | 7/2010 | Barkley et al. | |
| 2011/0069894 A1 | 3/2011 | Vans et al. | |
| 2011/0149331 A1 | 6/2011 | Duggan et al. | |

FOREIGN PATENT DOCUMENTS

| | | |
|---|---|---|
| JP | 2002-142128 | 5/2002 |
| JP | 2005265467 | 9/2005 |
| JP | 2007-033247 | 2/2007 |

OTHER PUBLICATIONS

Li, W-C. et al.; Defect Inspection in Low-contrast LCD Images Using Hough Transform-based Nonstationary Line Detection; Feb. 2011; pp. 136-147; vol. 7; Issue: 1.

International Search Report and Written Opinion of the International Searching Authority; International Application No. PCT/US2011/053444; Filed Sep. 27, 2011.

Defect Inspection in Low-contrast LCD Images Using Hough Transform-based Nonstationary Line Detection.

\* cited by examiner

Digital Image (300)

Scanned Image (302)

DETECTING PRINTING EFFECTS

RELATED APPLICATIONS

The present application claims the priority under 35 USC 371 of previous International Patent Application No. PCT/US2011/053444, filed Sep. 27, 2011, entitled "Detecting Printing Defects," which is incorporated herein by reference in its entirety.

BACKGROUND

Industrial printing systems are used to print images onto large volumes of substrates such as paper. The images are often stored as a digital image that is sent to the printing system to be printed. It is often important to an operator of such printing systems that any defects in the printing process be detected so that the problem can be quickly fixed before subsequent defective images are printed. A defect is any unwanted discoloration, marking, or characteristic of the printed image.

One way to check for such defects is to scan the printed image and compare the digital scanned image with the original digital image. However, the tolerances for variation between the scanned image and the original digital image have to be relatively high in order to account for expected discrepancies. These discrepancies arise due to a variety of factors including the inability of physical ink to perfectly match the digital colors and the inability of the scanner to perfectly capture the colors of the scanned image. Other discrepancies include spatial misalignment that occurs as the paper moves through its path during the scanning process. Due to the higher tolerances, various defects such as low contrast defects often go undetected. These low contrast defects, while difficult to detect with standard comparison functions, may be quite visible to the human eye.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, functions that compare the scanned digital image to the original digital image are designed with high tolerances in order to account for expected discrepancies. However, due to these higher tolerances, various defects such as low contrast defects often go undetected. These low contrast defects, while difficult to detect with standard comparison functions, may be quite visible to the human eye.

In light of this and other issues, the present specification discloses methods and systems for detecting defects within printed images. The methods and systems disclosed herein are particularly effective in detecting low contrast defects.

According to certain illustrative examples, an image that has been printed is scanned and put into a digital format. This scanning process can be done by an inline scanner that scans the image immediately after it has been printed onto the paper and as the paper continues to move along its path. Because the scanning process does not produce an exact replica of the original digital image, a color adjustment function is then applied to the original digital image used to print the image. This color adjustment function creates a matched reference image. The colors of the matched reference image are adjusted to better match the coloring of the scanned image. More detail on an example of how such a function may work will be provided below.

The matched reference image is then compared with the scanned image. The comparison function used to compare this function is designed to be robust enough to handle slight coloring variations and misregistration issues. A misregistration issue refers to an alignment issue between the scanned image and the matched reference image for purposes of the comparison. Significant differences between the scanned image and the matched reference image may be identified as defects. More details on how the comparison function may work will be described below. In some cases, a validation process may be used to ensure that differences are a result of actual defects and not random errors in the comparison function.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
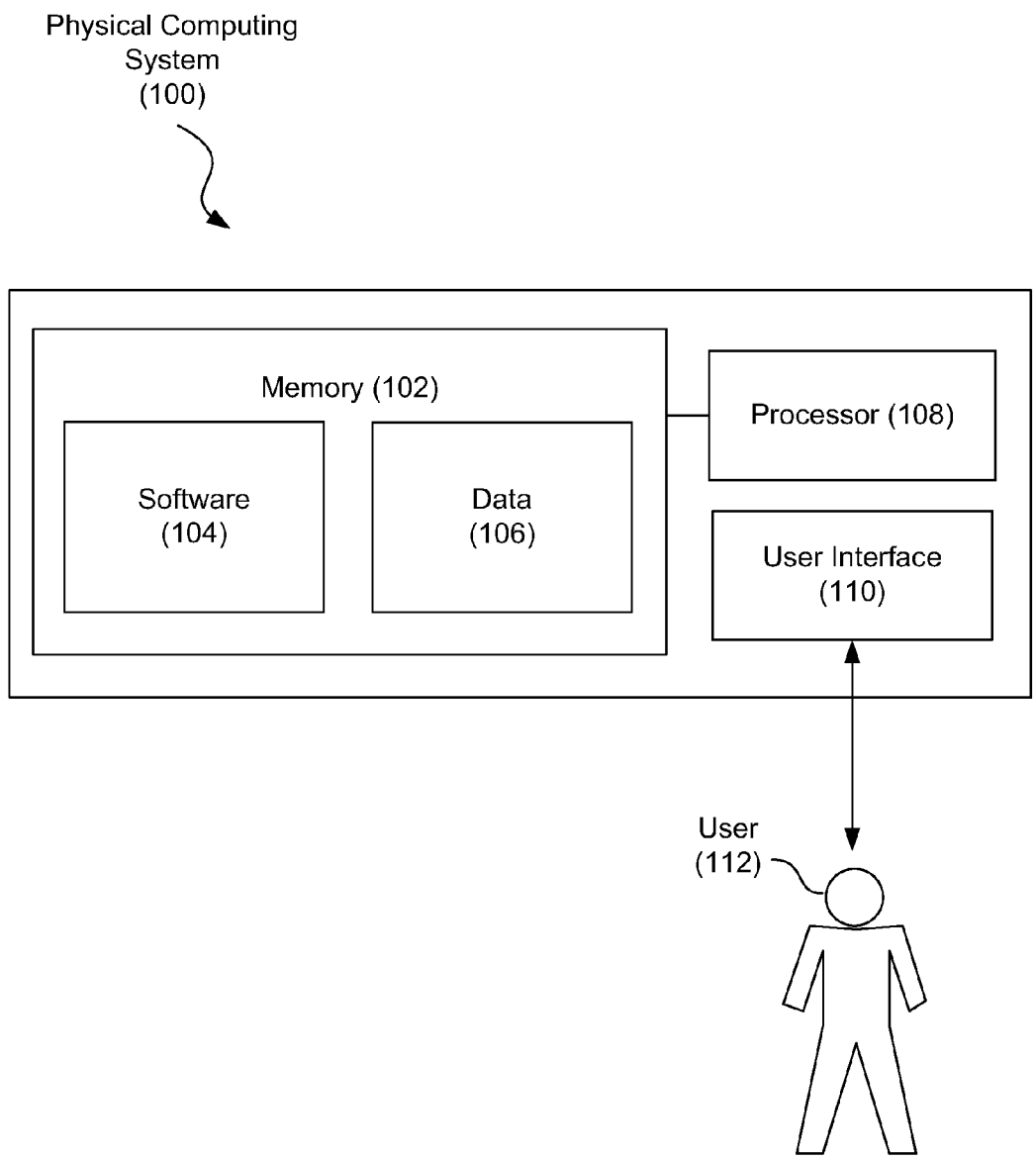
FIG. 1 is a diagram showing an illustrative physical computing system, according to one example of principles described herein.

Referring now to the figures, FIG. 1 is a diagram showing an illustrative physical computing system (100) that can be used to operate a printing system. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

Figure 2:
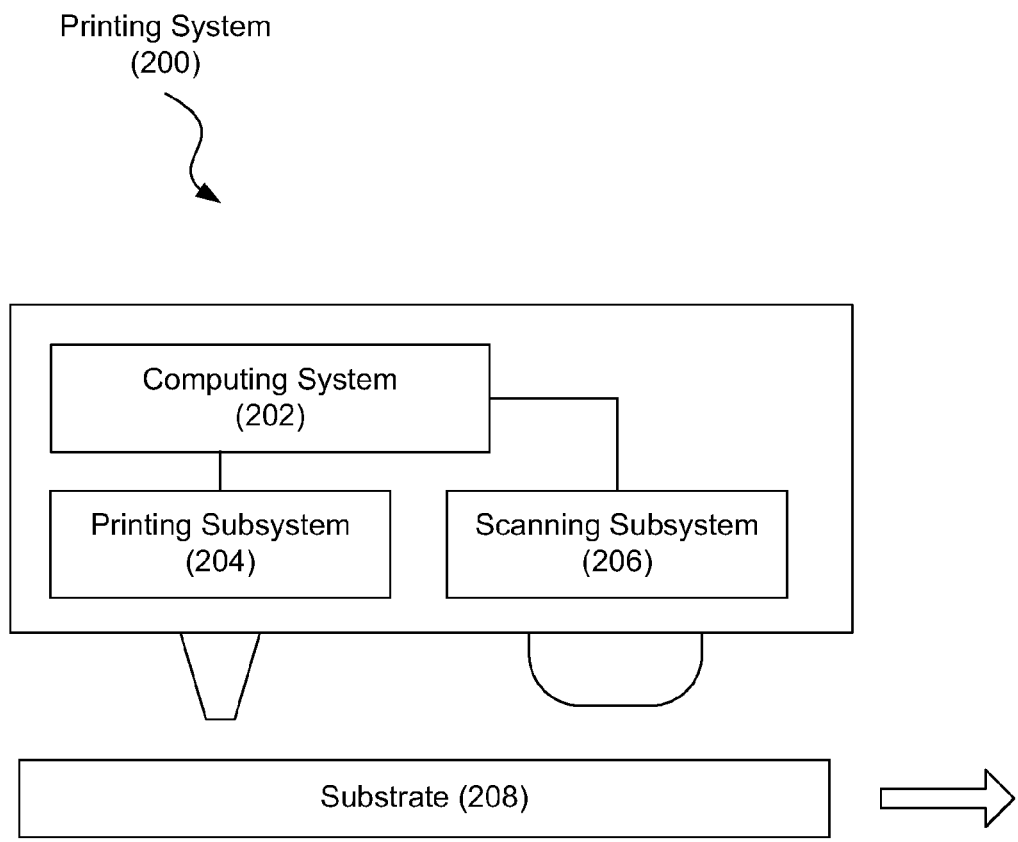
FIG. 2 is a diagram showing an illustrative printing system, according to one example of principles described herein.

FIG. 2 is a diagram showing an illustrative printing system (200). According to certain illustrative examples, an industrial printing system may include a printing subsystem (204) and a scanning subsystem (206). Both the printing subsystem (204) and the scanning subsystem (206) may be controlled by a computing system (202).

The printing subsystem (204) prints images onto a substrate (208) passing in relation to one or more printheads associated with the printing subsystem. After these images have been printed onto the substrate (208), the scanning subsystem (206) can scan those printed images for the purpose of detecting defects within those printed images. The computing system (202) can compare the scanned image with the digital image that was printed onto the substrate (208) in order to determine if any defects are present. By immediately scanning printed images, defects can be detected and corrected before subsequent defective images are printed.

Figure 3A:
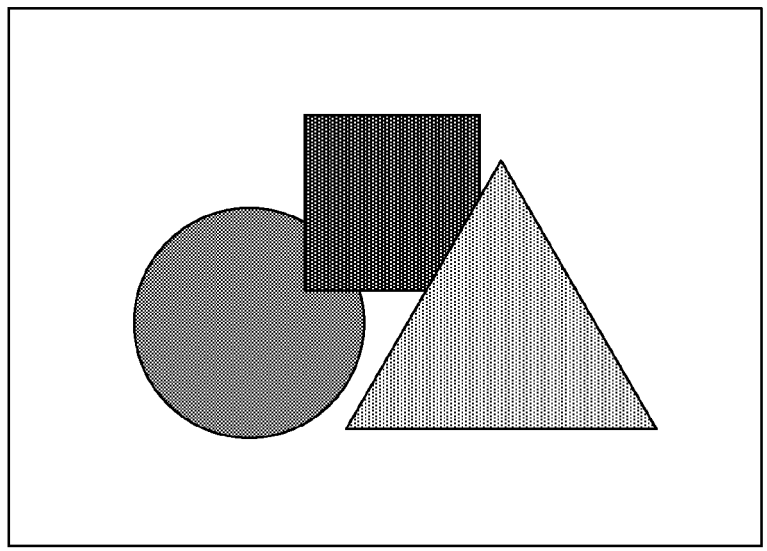
FIG. 3A is a diagram showing an illustrative digital image, according to one example of principles described herein.

FIG. 3A is a diagram showing an illustrative digital image. The images printed by printing systems are first stored as digital images. Typically, the digital image is created by a separate computing system and transferred to the printing system. The colors within a digital image are often represented using a Red Greed Blue (RGB) color scheme. In one format, a digital image is represented by storing a value for each individual pixel within the image. Each pixel stores intensity values for red, blue, and green. The varying intensity between these colors defines the variety of colors able to be formed by the RGB color scheme.

When the digital image is printed to a substrate such as paper, the color scheme is converted into the Cyan, Magenta, Yellow, and blacK (CMYK) color scheme. A standard printer uses half-toning functions with cyan, magenta, yellow, and black inks in order to create the appropriate image on the substrate. Although certain methods may be used to provide a relatively accurate conversion between the RGB color scheme and the CMYK color scheme, the scanning process does not quite capture the colors in a consistent manner.

Figure 3B:
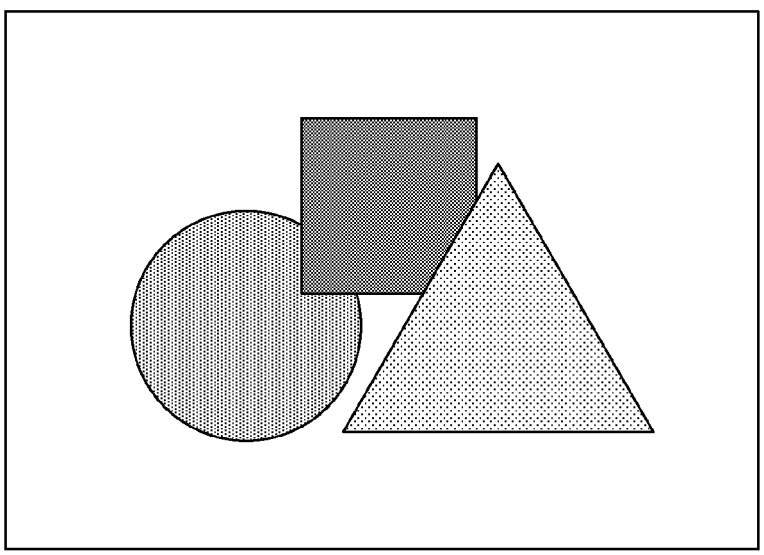
FIG. 3B is a diagram showing an illustrative scanned image, according to one example of principles described herein.

FIG. 3B is a diagram showing an illustrative scanned image (302). In addition to the variations that occur during the printing process, the scanning process also introduces variations. For example, the scanning process can introduce color instabilities, noise, drift and other issues that cause inconsistencies. Scanning hardware detects the colors that were printed onto the substrate and scanning software converts the image into a digital scanned image. The comparison between the digital image (300) and the scanned image (302) shows a slight variation in coloring.

Figure 4:
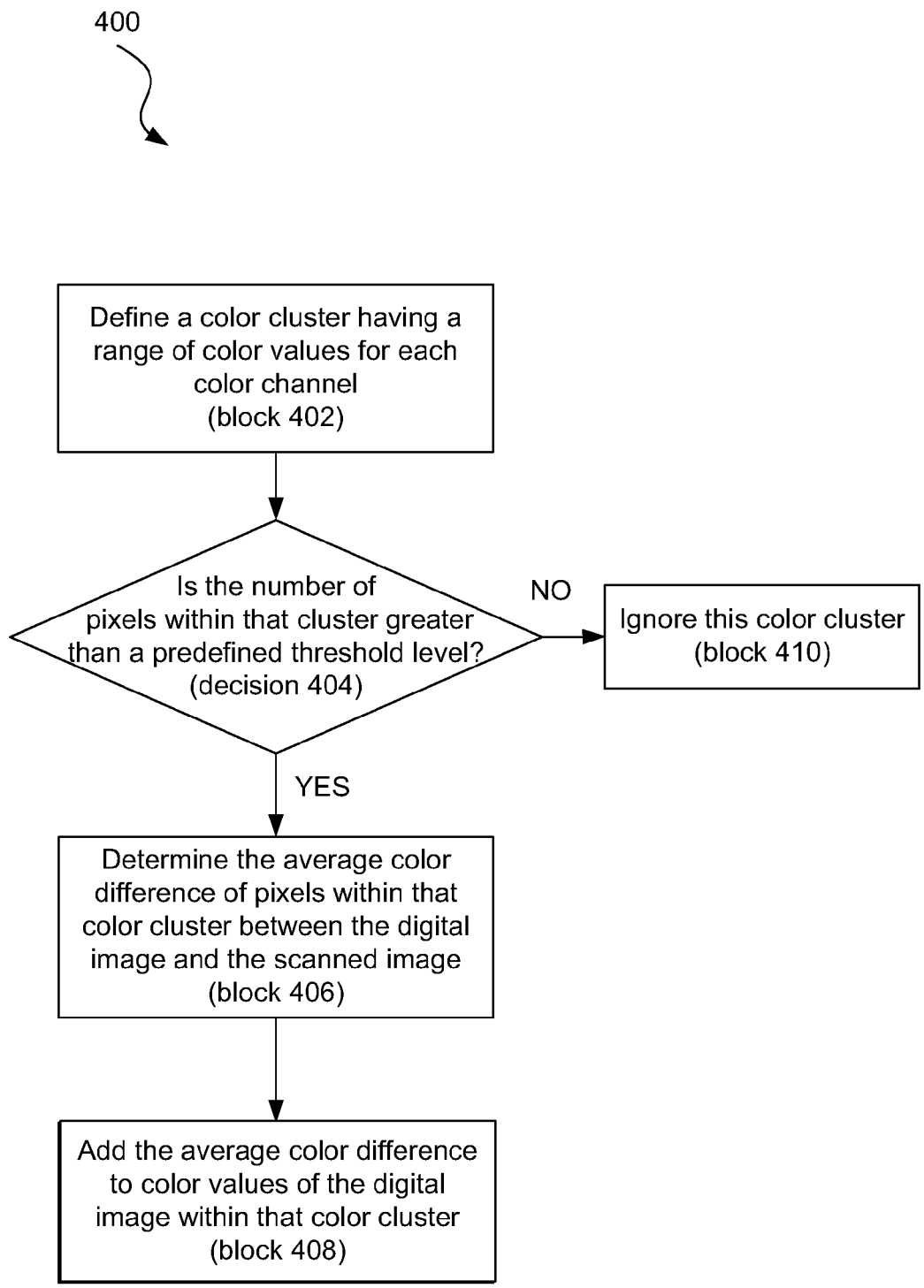
FIG. 4 is a flowchart showing an illustrative process for creating a matched reference image, according to one example of principles described herein.

FIG. 4 is a flowchart showing an illustrative process for creating a matched reference image. As mentioned above, in order to compare the scanned image with the original digital image for the purposes of detecting defects, the digital image is first adjusted to better match the coloring of the scanned image. The adjusted digital image will be referred to as the matched reference image.

According to certain illustrative examples, the color matching process (400) factors in the colors on each color channel. A color cluster is defined (block 402) that includes a range of color values from each channel. A color value refers to the digital number used to represent the intensity of a particular color at a particular pixel. For example, the variation in color intensity for the red channel may be represented as an eight bit value. Thus, the color value may range from 0-255.

In one example, the color matching process may define a cluster with red values between 20 and 30, green values between 50 and 60, and blue values between 120 and 130. The color matching process will then determine (decision 404) whether or not the number of pixels within this color cluster exceeds a predefined threshold level. In one example, this predefined threshold value may be 50 pixels.

If the number of pixels within that color cluster does not (decision 404, NO) exceed the predefined threshold, then this color cluster is ignored (block 410). This is because there may not be enough pixels within the image within this color cluster to accurately match to the scanned image. Thus, it may be more beneficial to ignore these pixels.

If, however, the number of pixels within that color cluster does indeed (decision 404, YES) exceed the predefined threshold number, then pixels within that cluster can be matched. This can be done by determining (block 406) the difference between the average color within that range from the digital image and the average color within that range from the scanned image. This average difference is then added (block 408) to the color values for each pixel within that color cluster to form the matched reference image. This process is then performed for the remaining color value ranges within each of the color channels.

In many cases, the scanning system will read the same color on the printed image differently. This may be due to a variety of factors including the varying distance between the substrate and the scanner sensors. This varying distance is dues to the motion of the paper as it moves underneath the scanner. These variations are referred to as the scanner instability. This instability tends to be greater for brighter colors than for darker colors. In order to compensate for this instability, a stability measure is created for each color value range of each channel.

The stability measure can be defined as the standard deviation in the difference between the scanned image colors and the digital image colors within the color value range. The standard deviation is a measurement of the variation from the mean value. The stability measure from each color value range from each color channel can be combined to form a stability map. With the stability map and the matched reference image, a more accurate comparison can be made to the scanned image for the purpose of detecting defects.

Figure 5:
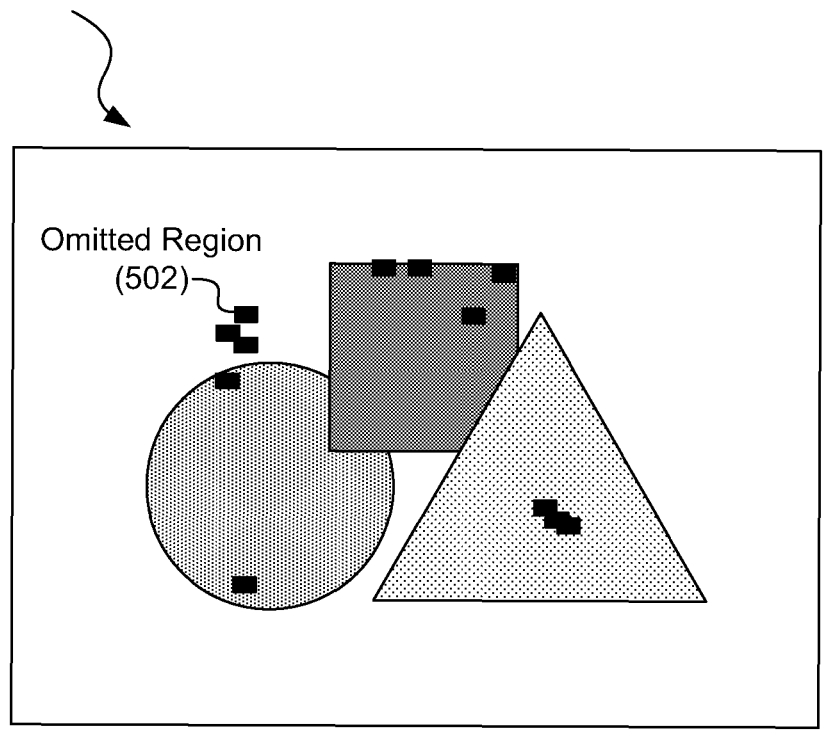
FIG. 5 is a diagram showing an illustrative matched reference image, according to one example of principles described herein.

FIG. 5 is a diagram showing an illustrative matched reference image (500). According to certain illustrative examples, the matched reference image includes omitted regions (502). The omitted regions (502) are those in which the color value of the pixels was a value within a range that had less than the predefined threshold number of pixels. Thus, these pixels were ignored during the matching process. However, the majority of the picture has been matched and appears similar in color to the scanned image (e.g. 302, FIG. 302).

Figure 6:
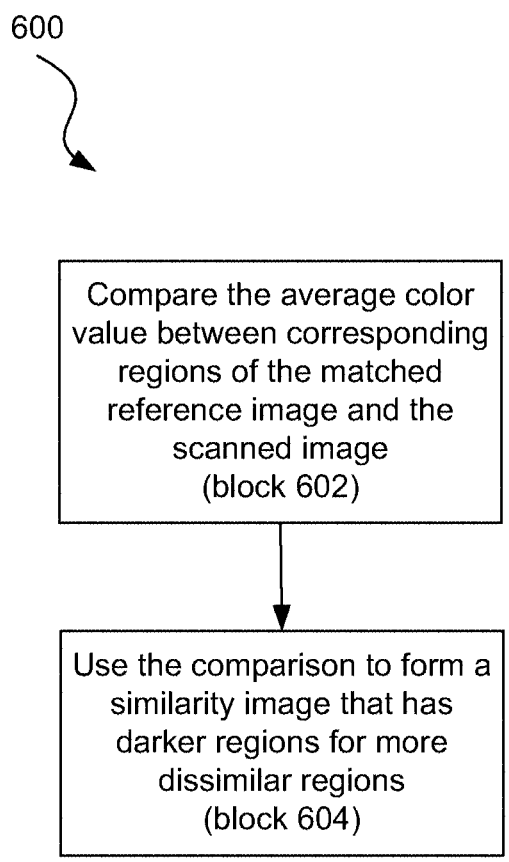
FIG. 6 is a diagram showing an illustrative process for comparing the similarity between a matched reference image and a scanned image, according to one example of principles described herein.

FIG. 6 is a diagram showing an illustrative process for comparing the similarity between a matched reference image and a scanned image. After the matched reference image has been created, it can be compared with the scanned image. Significant differences between the matched reference image and the scanned image may indicate a defect within the printed image. According to certain illustrative examples, the process includes comparing (block 602) the average color value between corresponding regions of the matched reference image and the scanned image. The process further includes using (block 604) the comparison to form a similarity image that has darker regions for more dissimilar regions.

The similarity image may be represented in values between zero and one. A value of zero indicates no similarity and a value of one indicates absolute similarity. This similarity image can be rendered as a grayscale image with values closer to zero being darker and values closer to one being lighter.

The manner in which the similarity is measured is designed to be robust against the variations between the matched reference image and the scanned image which may still exist. Additionally, the similarity measurement is robust against spatial misregistration between the matched reference image and the scanned image. The similarity measure may start by measuring the luminance similarity between two corresponding patches from the matched reference image and the scanned image. Luminance is a measurement of the brightness of a color or region of colors. A patch may be a group of pixels such as a 5×5 square or a 9×9 square of pixels. The comparison of two patches may be referred to as the comparison between patch A and patch B. The luminance difference between two patches is defined by:

$$LumDiff(A, B) = \frac{2xy}{x^2 + y^2} \quad \text{(Equation 1)}$$

Where:
LumDiff(A, B) is the luminance difference between the two patches;
$x = 0.5 + (\mu A - \mu B)/2$;
$y = 0.5 - (\mu A - \mu B)/2$;
$\mu A$ = the mean color value of patch A; and
$\mu B$ = the mean color value of patch B.

Using this equation, the luminance similarity between the two patches can be determined using the following equation:

$$SPLum(A, B) = \min\left(1, \frac{LumDiff(A, B)}{\min_k (LumDiff(A, A_k))}\right) \quad \text{(Equation 2)}$$

Where
SPLum(A,B) is the similarity in luminance between the two patches;
$A_k$ is one of the eight neighbors of patch A within the image that A is from; and
the min function finds the minimum value within a set.

To compensate for the scanner instability, a context aware luminance (CALum) is defined by the following equation:

$$CALum(A, B, C) = \min\left(1, \frac{SPLum(A, B)}{selfLum(C)}\right) \quad \text{(Equation 3)}$$

Where:
CALum(A, B, C) = the context aware luminance between patches A, B, and C;
selfLum(C) = Lum(0.5+C/2, 0.5−C/2); and
Lum(a, b) = $2\mu_a\mu_b/(\mu_a^2 + \mu_b^2)$.

Using these equations, CALum(A, B, C) can be determined where A is a patch from the scanned image, B is a corresponding patch from the matched reference image, and C is a corresponding patch from the stability map. This function can be applied to each color channel and the pixel-wise minimum between each color channel can be used to form the similarity image.

Figure 7:
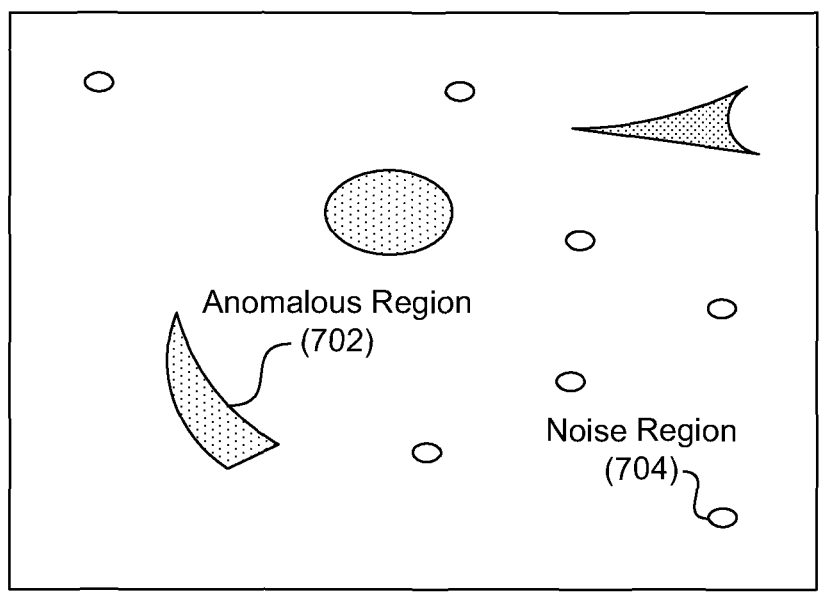
FIG. 7 is a diagram showing an illustrative similarity image, according to one example of principles described herein.

FIG. 7 is a diagram showing an illustrative similarity image (700). As mentioned above, the similarity image (700) may be a grayscale image where values closer to zero are represented by darker shades of gray and values closer to one are represented by lighter shades of gray. If there are any defects in the image, various anomalous regions (702) where darker colors exist will be present. In addition to the anomalous regions (702), various noise regions (704) may be present. These noise regions (704) may be anomalous but do not necessarily represent a defect. For example, variations in the scanning system and anomalies in the similarity measurement function may lead to various noise regions (704) which do not actually correspond to a defect. In order to determine if a particular anomalous region is due to noise or a defect, a validation process may be performed.

Figure 8:
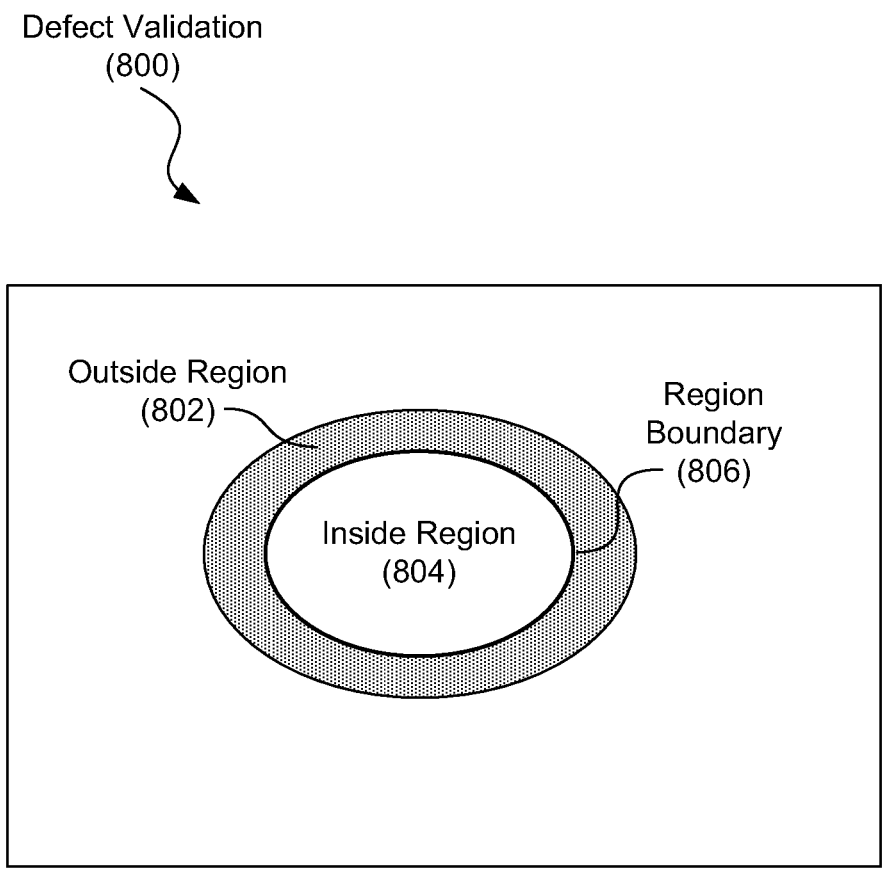
FIG. 8 is a diagram showing an illustrative process for validating defects, according to one example of principles described herein.

FIG. 8 is a diagram showing an illustrative process for validating defects. According to certain illustrative examples, the defect validation process (800) may involve analyzing the coloring within the boundary (806) of a region on the scanned image that corresponds with the anomalous region of the similarity image. The inside region (804) of region boundary (806) is then compared with the coloring immediately outside (802) of the region boundary (806).

If the coloring between the outside region (802) and the inside region (804) are similar, then it is likely that the anomalous region is not a defect. However, if the inside region (804) and the outside region (802) are somewhat different, then it is likely that the anomalous region within the similarity image does in fact correspond to a defect. Various methods of comparing the coloring between the inside region and the outside region may be used such as comparing the average color between the two regions.

Figure 9:
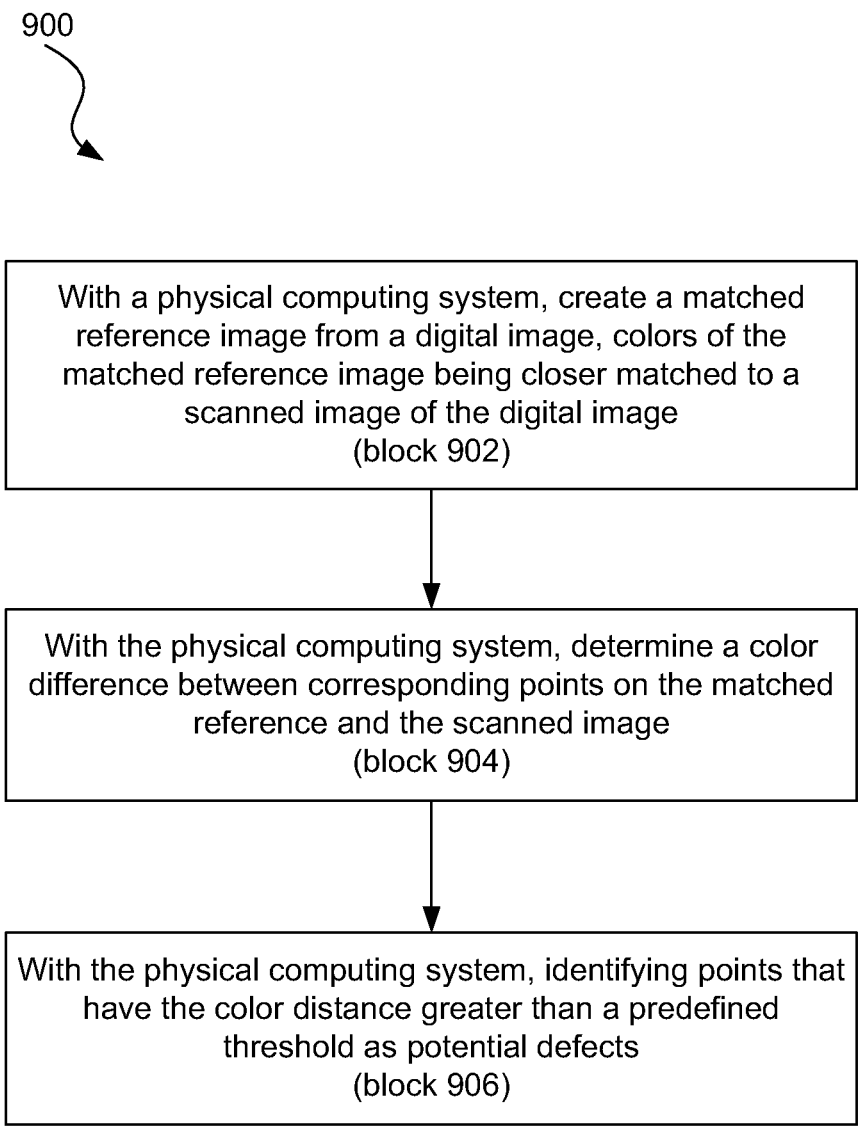
FIG. 9 is a flowchart showing an illustrative method for detecting image defects, according to one example of principles described herein.

FIG. 9 is a flowchart showing an illustrative method (900) for detecting image defects. According to certain illustrative examples, the method (900) includes, with a physical computing system, creating (block 902) a matched reference image from a digital image, colors of the matched reference image being closer matched to a scanned image of the digital image.

The method further includes, determining (block 904) a color difference between corresponding points on the matched reference and the scanned image. Determining this difference may be done by creating a similarity image that represents differences with a value from zero to one. A value closer to zero indicates dissimilarity while a value closer to one indicates similarity.

The method further includes, with the physical computing system, identifying (block 906) points that have the color distance greater than a predefined threshold as potential defects. These points that have a color distance greater than a predefined threshold may be manifested in the similarity image as anomalous regions. The anomalous regions may be darker regions indicating more dissimilarity.

In sum, through use of methods and systems embodying principles described herein, an effective method for determining defects in printed images is realized. The methods and systems described herein are particularly effective at determining low contrast defects. The methods are robust enough to handle color variations in the scanned image as well as spatial misregistration between the scanned image and the reference image.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for detecting printing defects, the method comprising:
   with a physical computing system, creating a matched reference image from a digital image, colors of said matched reference image being closer matched to a scanned image of said digital image;
   with said physical computing system, determining a color difference between corresponding points on said matched reference image and said scanned image; and
   with said physical computing system, identifying points that have said color difference greater than a predefined threshold as potential defects,
   wherein forming said matched reference image comprises:
      with said physical computing system, for a range of color values for a color channel, determining an average color difference between corresponding pixels within said digital image and said scanned image for said range; and
      with said physical computing system, adding said average color difference to color values of said digital image within said range to form said matched reference image.

2. The method of claim 1, wherein if a number of pixels within said range of color values for said color channel is less than a predefined threshold, pixels within said range are omitted from said matched reference image.

3. The method of claim 1, wherein determining a color difference between said matched reference image and said scanned image comprises forming a similarity image, said similarity image comprising a grayscale depiction of color differences between corresponding points between said scanned image and said matched reference image.

4. The method of claim 3, wherein a similarity measure used to determine said color differences comprises features for being tolerant to at least one of: spatial misregistration and scanner color instabilities.

5. The method of claim 4, further comprising, determining whether an anomalous region of said similarity image corresponds to a defect by comparing colors inside of a boundary of a region on said scanned image with colors outside of said boundary of said region, wherein said region on said scanned image corresponds to said anomalous region of said similarity image.

6. The method of claim 1, wherein said physical computing system is integrated with a printing system used to print said digital image.

7. The method of claim 4, wherein said printing system comprises a scanning system to create said scanned image.

8. The method of claim 1, wherein said scanned image is created after a said digital image has been printed.

9. The method of claim 2, wherein said matched reference image indicates omitted regions which were ignored during a matching process.

10. The method of claim 3, wherein forming a similarity image comprises measuring a luminance similarity between two corresponding patches from said matched reference image and said scanned image.

11. The method of claim 9, further comprising wherein forming a similarity image further comprises determining a context aware luminance.

12. The method of claim 5, wherein said anomalous region is not a defect when the coloring in said inside of said regions is similar to a coloring of said outside of said regions.

13. A computing system comprising:
    at least one processor;
    a memory communicatively coupled to the at least one processor, the memory comprising computer executable code that, when executed by the at least one processor, causes the at least one processor to:
       create a matched reference image from a digital image, colors of said matched reference image being closer matched to a scanned image of said digital image;
       determine a color difference between corresponding points on said matched reference image and said scanned image, wherein to determine said color difference between said matched reference image and said scanned image, said computer executable code causes said processor to form a similarity image, said similarity image comprising a grayscale depiction of color differences between corresponding points between said scanned image and said matched reference image; and
       identify points that have said color difference greater than a predefined threshold as potential defects.

14. The system of claim 13, wherein to form said matched reference image, said computer executable code causes said processor to:
    for a range of color values for a color channel, determine an average color difference between corresponding pixels within said digital image and said scanned image for said range; and
    add said average color difference to color values of said digital image within said range to form said matched reference image.

15. The system of claim 14, wherein if a number of pixels within said range of color values for said color channel is less than a predefined threshold, pixels within said range are omitted from said matched reference image.

16. The system of claim 13, wherein:
    darker shades of gray indicate more dissimilar regions; and
    lighter shades of gray indicate more similar regions.

17. The system of claim 16, wherein color differences are computed for each color channel and combined to form said similarity image.

18. The system of claim 17, wherein said computer executable code further causes said processor to determine whether an anomalous region of said similarity image corresponds to a defect by comparing colors inside of a boundary of a region on said scanned image with colors outside of said boundary of said region, wherein said region on said scanned image corresponds to said anomalous region of said similarity image.

19. A computer program product for detecting image defects, said computer program product comprising:
   a non-transitory computer readable storage medium having computer readable code embodied therewith, said computer readable program code comprising:
   computer readable program code to define a number of color clusters of a digital image, said color clusters including a range of color values from color channels;
   computer readable program code to create a matched reference image from said digital image, by adjusting said digital image coloring of pixels within said color duster, wherein said matched reference image includes omitted regions corresponding to regions of said digital image that have less than a predefined threshold number of pixels to use for matching;
   computer readable program code to create a stability map for each color value range of each color channel;
   computer readable program code to determine a color difference between corresponding points on said matched reference image and a scanned image;
   computer readable program code to form a similarity image based on a determined color difference;
   computer readable program code to identify points that have said color difference greater than a predefined threshold as potential defects, which potential defects are manifest in said similarity image as an anomalous region; and
   computer readable program code to validate said anomalous region by comparing colors inside and outside of regions of said scanned image that correspond to said anomalous region of said matched reference image.

* * * * *

UNITED STATES PATENT AND TRADEMARK OFFICE
CERTIFICATE OF CORRECTION

PATENT NO. : 9,704,236 B2  
APPLICATION NO. : 14/345389  
DATED : July 11, 2017  
INVENTOR(S) : Hadas Kogan Page 1 of 1

It is certified that error appears in the above-identified patent and that said Letters Patent is hereby corrected as shown below:

On the Title Page

In item (75), Inventors, in Column 1, Line 1, delete "Yaacov" and insert -- Yaakov --, therefor.

In the Claims

In Column 9, Line 15 approx., in Claim 19, delete "duster," and insert -- cluster, --, therefor.

Signed and Sealed this  
Tenth Day of July, 2018

Andrei Iancu  
*Director of the United States Patent and Trademark Office*